US012711514B2

(12) United States Patent
Kodimer

(10) Patent No.: US 12,711,514 B2
(45) Date of Patent: Aug. 18, 2026

(54) SYSTEM AND METHOD TO PREDICT AND PREVENT CUSTOMER CHURN IN SERVICING BUSINESS

(71) Applicant: TOSHIBA TEC KABUSHIKI KAISHA, Tokyo (JP)

(72) Inventor: Marianne Kodimer, Huntington Beach, CA (US)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 541 days.

(21) Appl. No.: 18/125,549

(22) Filed: Mar. 23, 2023

(65) Prior Publication Data

US 2023/0230100 A1 Jul. 20, 2023

Related U.S. Application Data

(63) Continuation-in-part of application No. 17/378,121, filed on Jul. 16, 2021, now abandoned.

(51) Int. Cl.
*G06Q 30/01* (2023.01)
*G06F 3/12* (2006.01)
(Continued)

(52) U.S. Cl.
CPC ........... *G06Q 30/01* (2013.01); *G06F 3/1203* (2013.01); *G06F 3/1225* (2013.01); *G06F 3/1229* (2013.01); *G06F 3/1273* (2013.01); *G06F 8/65* (2013.01); *G06F 9/542* (2013.01); *G06F 11/0733* (2013.01); *G06F 11/0793* (2013.01);
(Continued)

(58) Field of Classification Search
CPC .. G06Q 30/01; G06Q 10/0639; G06Q 30/018; G06Q 30/0202; G06Q 30/0234; G06Q 10/20; G06F 3/1203; G06F 3/1225; G06F 3/1229; G06F 3/1273;
(Continued)

(56) References Cited

U.S. PATENT DOCUMENTS

2002/0194180 A1* 12/2002 Alsop .................... G03G 21/02
2014/0025569 A1* 1/2014 Jones .................... G06Q 30/06
705/40

(Continued)

OTHER PUBLICATIONS

Patrick Campbell, Ultimate Guide to Churn Rate: Definition & 4 Churn Rate Formulas for Calculating Churn, 2020 (Year: 2020).*

*Primary Examiner* — Tarek Elchanti
(74) *Attorney, Agent, or Firm* — Kim & Stewart LLP

(57) ABSTRACT

A system and method for minimizing customer churn in device service businesses commences with execution of a customer service contract. Ongoing customer data capture is made for each contract. Customer data includes contract events, environmental events, service events, device usage analytics and personnel events. Machine learning is applied to captured customer data, which machine learning is based on a state of customer data at the time of contract determination. Customer data is assigned weights, and aggregate data for each customer is compared to a preselected threshold level. Customers above a threshold are deemed happy and customers below the threshold are deemed to be at risk. Remedial measures relative to at risk customer data generates levels of automated remediation followed by remedial measure suggestions to an administrator when not sufficiently successful.

8 Claims, 9 Drawing Sheets

(51) Int. Cl.

| | |
|---|---|
| ***G06F 8/65*** | (2018.01) |
| ***G06F 9/54*** | (2006.01) |
| ***G06F 11/07*** | (2006.01) |
| ***G06Q 10/0639*** | (2023.01) |
| ***G06Q 30/0201*** | (2023.01) |
| ***H04N 1/00*** | (2006.01) |

(52) U.S. Cl.
CPC ................. *G06Q 10/06393* (2013.01); *G06Q 30/020122* (2025.08); *H04N 1/00832* (2013.01); *G06F 3/1286* (2013.01); *G06F 3/1287* (2013.01); *H04N 2201/0094* (2013.01)

(58) Field of Classification Search
CPC . G06F 3/1286; G06F 3/1287; H04N 1/00832; H04N 2201/0094; G06N 20/00
USPC ....................................................... 705/14.34
See application file for complete search history.

(56) References Cited

U.S. PATENT DOCUMENTS

| | | | | |
|---|---|---|---|---|
| 2017/0061344 | A1* | 3/2017 | Han | G06Q 10/0635 |
| 2019/0018628 | A1* | 1/2019 | Sloan, IV | G06F 3/1215 |
| 2022/0229756 | A1* | 7/2022 | Sharma | G06F 11/3409 |

* cited by examiner

Figure 4:
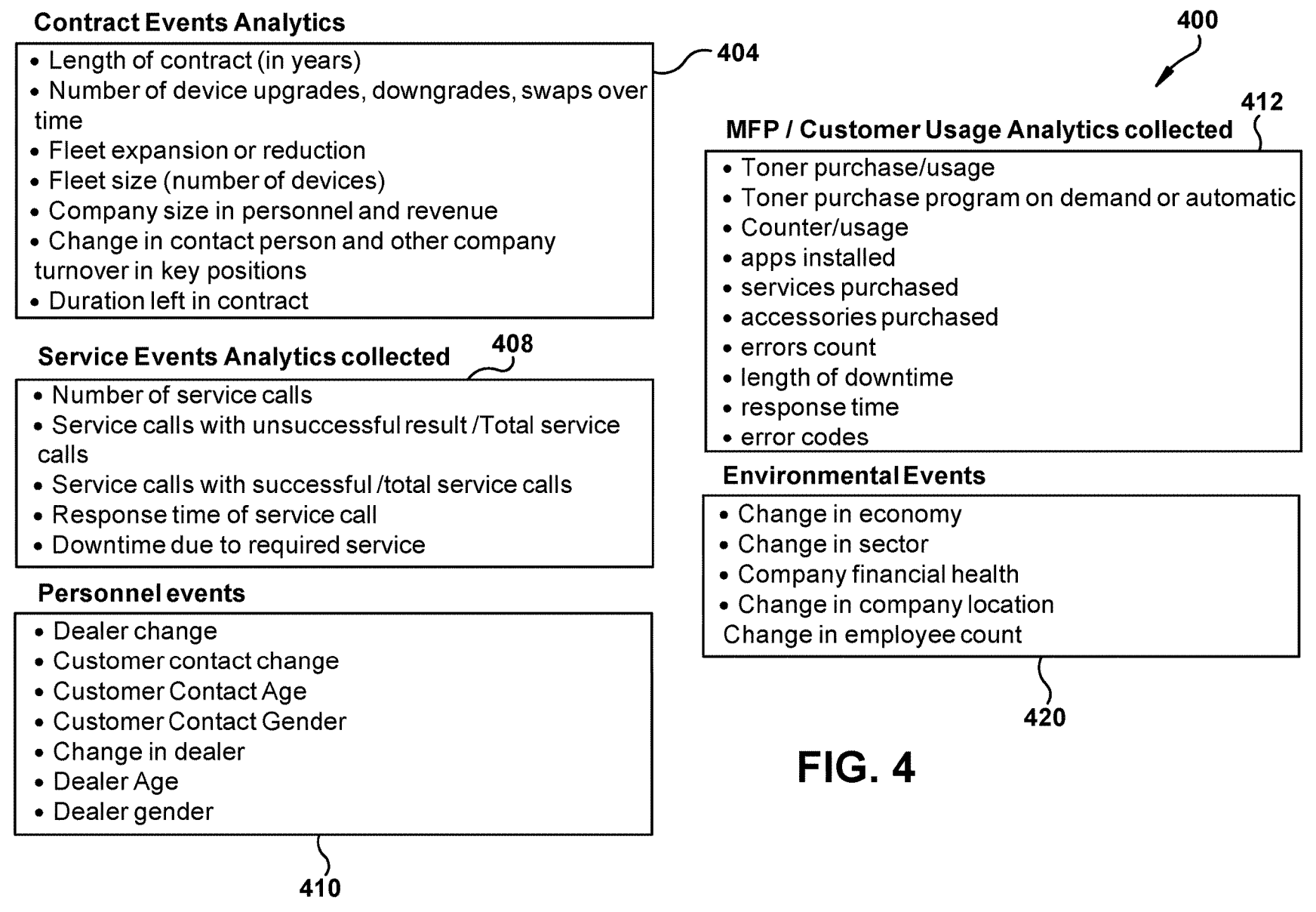

400

Contract Events Analytics 404

- Length of contract (in years)
- Number of device upgrades, downgrades, swaps over time
- Fleet expansion or reduction
- Fleet size (number of devices)
- Company size in personnel and revenue
- Change in contact person and other company turnover in key positions
- Duration left in contract

Service Events Analytics collected 408

- Number of service calls
- Service calls with unsuccessful result /Total service calls
- Service calls with successful /total service calls
- Response time of service call
- Downtime due to required service

Personnel events

- Dealer change
- Customer contact change
- Customer Contact Age
- Customer Contact Gender
- Change in dealer
- Dealer Age
- Dealer gender

410

MFP / Customer Usage Analytics collected 412

- Toner purchase/usage
- Toner purchase program on demand or automatic
- Counter/usage
- apps installed
- services purchased
- accessories purchased
- errors count
- length of downtime
- response time
- error codes

Environmental Events

- Change in economy
- Change in sector
- Company financial health
- Change in company location Change in employee count

SYSTEM AND METHOD TO PREDICT AND PREVENT CUSTOMER CHURN IN SERVICING BUSINESS

This application is a continuation-in-part from U.S. application Ser. No. 17/378,121, filed on Jul. 16, 2021.

TECHNICAL FIELD

This application relates generally to monitoring events relative to a service contract to gage a customer satisfaction level. The application relates more particularly to an artificial intelligence system that predicts when a low customer satisfaction level may lead to contract termination and implements or suggests remedial actions to raise the customer's satisfaction level.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Businesses having one or more MFPs often enter into service contracts with a dealer or other service entity. Customer churn (or attrition) is a rate at which customers abandon a brand or servicing business. It more expensive and difficult to acquire a new customer than to retain an existing one. Companies may use customer feedback and surveys to collect data that may help to provide insights into customer satisfaction and causes of dissatisfaction and attrition. However, resulting data is limited and reveals only obvious causes of customer dissatisfaction.

BRIEF DESCRIPTION OF THE DRAWINGS

Various embodiments will become better understood with regard to the following description, appended claims and accompanying drawings wherein:

FIG. 4 is an example embodiment showing datapoints for customer or contract events for analysis;

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Example embodiments herein predict when a customer will leave so an associated servicing company can make additional efforts to retain the customer and also change the current business practices and processes to preemptively maintain customer satisfaction. Big data and artificial intelligence (AI), which may comprise machine learning (ML), is used to systematically collect analytics from a large array of aspects of an MFP servicing business, beginning with contract commencement, to find corollary relationships and patterns between events and attrition, as well as events and retention, over an entire course of the customer-servicing business relationship. Analytics are employed to gather data from a variety of sources to find correlations between events and attrition/retention.

Figure 1:
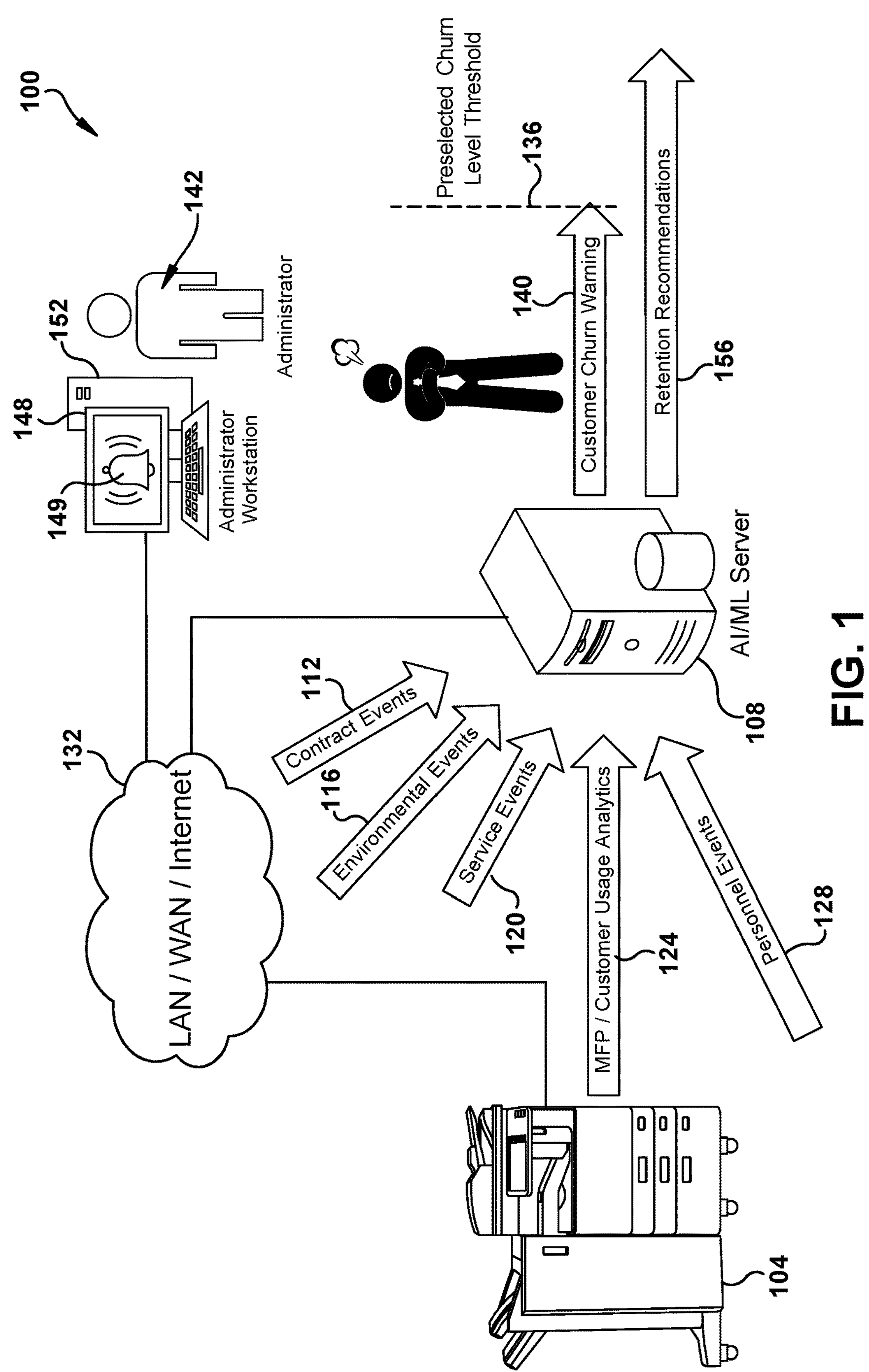
FIG. 1 is an example embodiment of a system to predict and prevent customer churn in a servicing business.

FIG. 1 illustrates an example embodiment of a system 100 to predict and prevent customer churn in a servicing business. One or more MFPs, such as MFP 104, are associated with a device service contract. For each service contract, an AI/ML server 108 receives and stores customer data, comprising customer events associated with the contract. Customer data may include contract events 112, environmental events 116, service events 120, MFP/customer usage analytics 124 and personnel events 128. Certain customer service information, such as MFP/customer usage analytics, such as error codes, copy counts or toner levels, is suitably acquired from each MFP associated with a contract via network cloud 132. Network cloud 132 is suitably comprised of a local area network (LAN), a wide area network (WAN), which may comprise the Internet, or any suitable combination thereof.

Machine learning is applied to stored customer service information to gage a customer's satisfaction level. When a customer's satisfaction level falls below a preselected threshold 136, a customer churn warning 140 is generated and displayed to administrator 142, suitably generating a notification or alarm 149 on a display 148 of an administrator workstation 152. Possible remedial actions associated with customer events are stored in server 108 and suitably displayed for each contract subject to a customer churn warning. An alarm is any suitable audible, visual or haptic notification, and may also comprise an e-mail to an administrator.

Server 108 includes any suitable AI/ML system, such as TensorFlow, Google Cloud ML Engine, Amazon Machine Learning (AML), Accord.net, Apache Mahout, or any other suitable platform.

Figure 2:
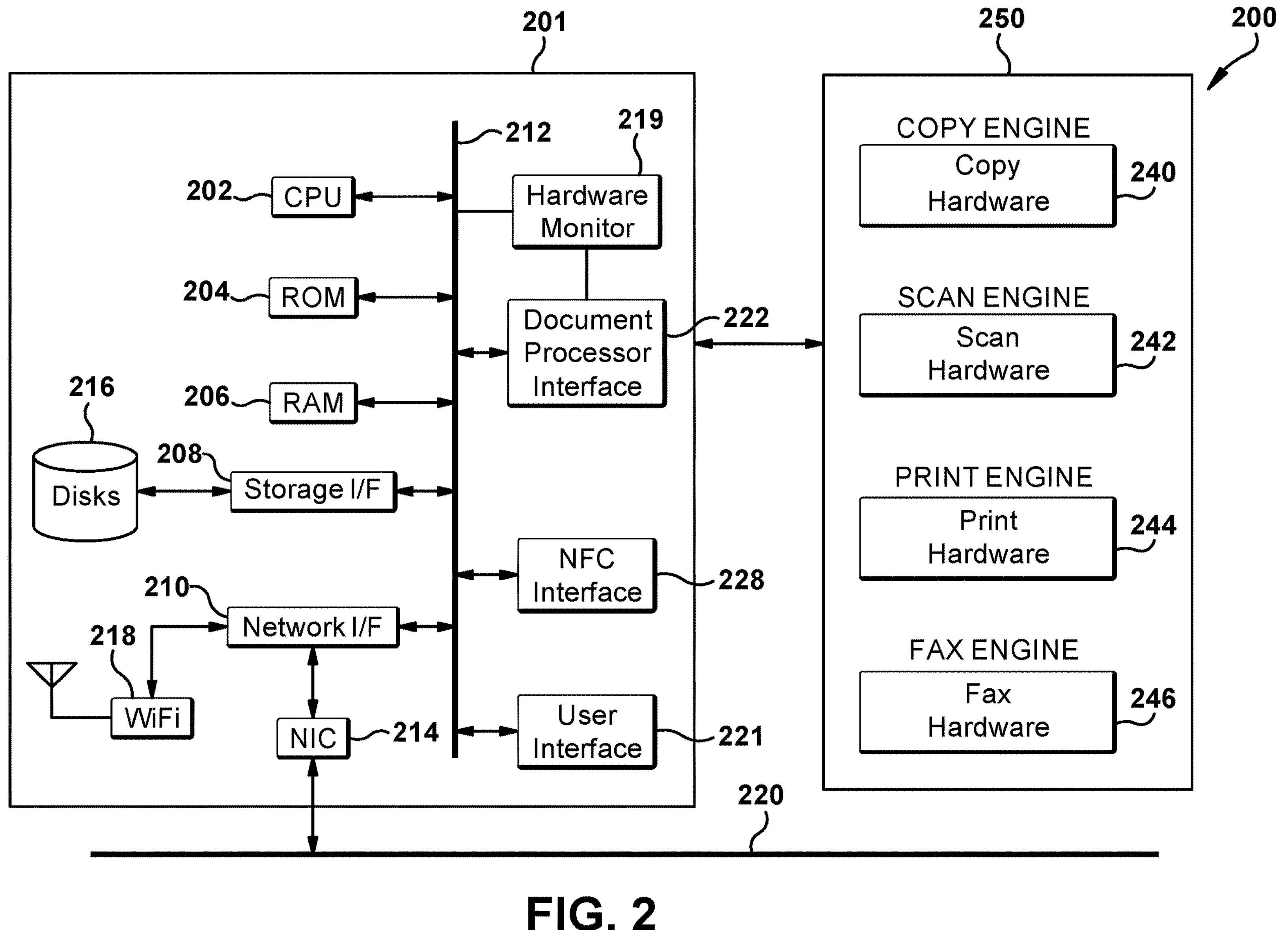
FIG. 2 is an example embodiment of a networked digital device such as a multifunction peripheral.

Turning now to FIG. 2, illustrated is an example embodiment of a networked digital device comprised of document rendering system 200 suitably comprised within an MFP, such as with MFP 104 of FIG. 1. It will be appreciated that an MFP includes an intelligent controller 201 which is itself a computer system. Thus, an MFP can itself function as a server with the capabilities described herein. Included in intelligent controller 201 are one or more processors, such as that illustrated by processor (CPU) 202. Each processor is suitably associated with non-volatile memory, such as read-only memory (ROM) 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired interface or physical network connection 220, or to a wireless data connection via wireless network interface 218. Processor 202 is also in data communication with hardware monitor 219, suitably comprised of counters, toner, paper or ink level sensors, temperature sensors, error condition sensors, paper jam sensors or the like. Example wireless data connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. Processor 202 is also in data communication with user interface 221 for interfacing with displays, keyboards, touchscreens, mice, trackballs and the like.

Also in data communication with data bus 212 is a document processor interface 222 suitable for data communication with the document rendering system 200, including MFP functional units. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
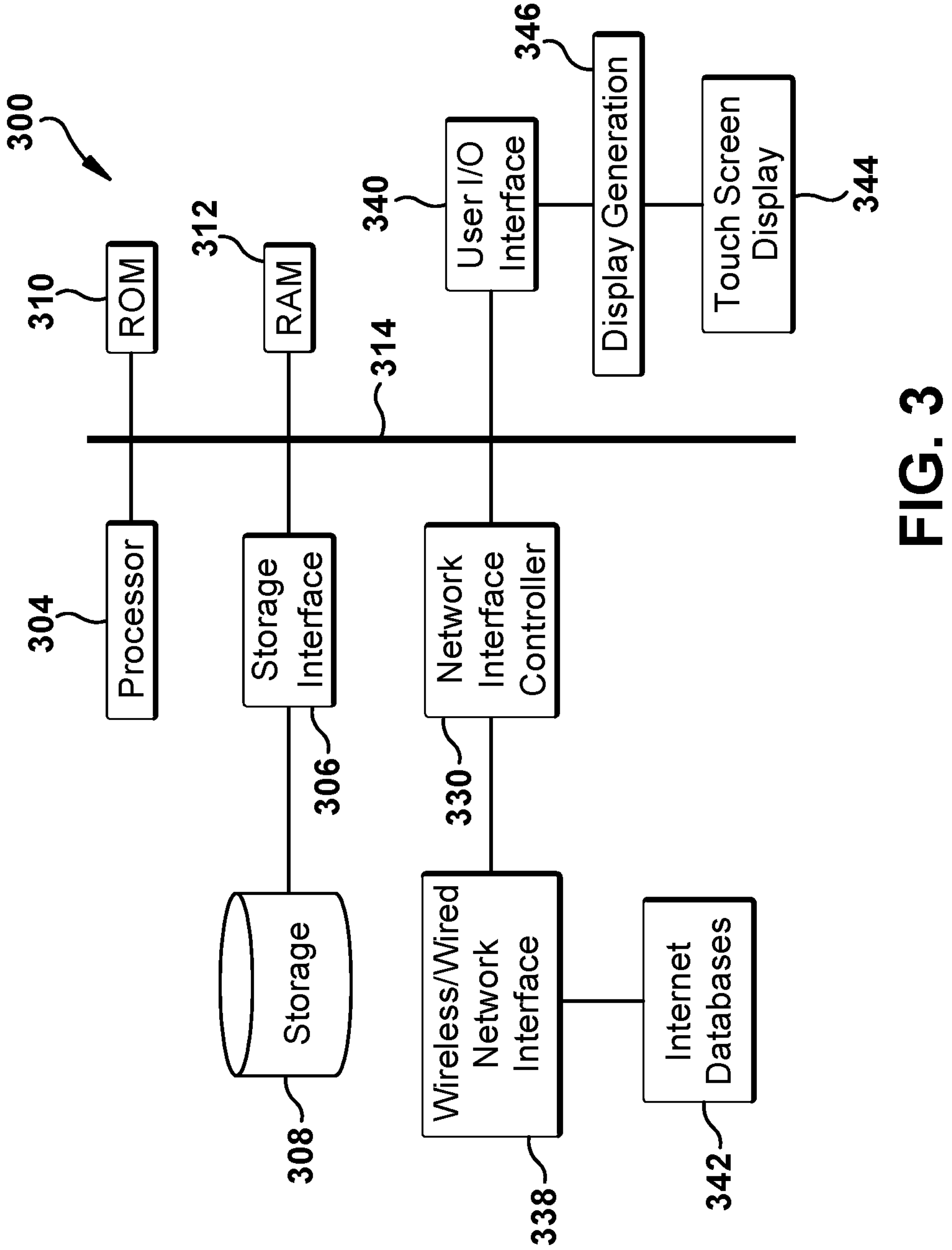
FIG. 3 is an example embodiment of a digital device system such as a server.

Turning now to FIG. 3, illustrated is an example embodiment of a digital data processing device 300 such as server 108 of FIG. 1. Components of the digital data processing device 300 suitably include one or more processors, illustrated by processor 304, memory, suitably comprised of read-only memory 310 and random access memory 312, and bulk or other non-volatile storage 308, suitably connected via a storage interface 306. Storage 308 includes stored contract records, personnel records, service records, and the like. A network interface controller 330 suitably provides a gateway for data communication with other devices, such as via wireless network interface 338. A user input/output interface 340 suitably provides display generation 346 providing a user interface via touchscreen display 344, suitably displaying images from display generator 346. It will be understood that the computational platform to realize the system as detailed further below is suitably implemented on any or all of devices as described above. Network Interface 338 is suitably connected to the Internet for access to Internet databases 342 from which event data, such as environmental events.

Referring next to FIG. 4, illustrated is an example embodiment showing datapoints 400 for customer or contract events for analysis which are suitably gathered from the inception of customer contract. Analytics are gathered from a variety of sources including those pertaining to the purchasing and servicing contract, servicing events, customer usage, environmental factors, and personnel events. The following categorization and analytics are obtained over time:

Contract Events Analytics 404:
- Length of contract (in years)
- Number of device upgrades, downgrades, swaps over time
- Fleet expansion or reduction
- Fleet size (number of devices)
- Company size in personnel and revenue
- Change in contact person and other company turnover in key positions
- Duration left in contract Service Events Analytics Collected 408:
- Number of service calls
- Service calls with unsuccessful result/Total service calls
- Service calls with successful/total service calls
- Response time of service call
- Downtime due to required service Personnel Events 410:
- Dealer change
- Customer contact change
- Customer Contact Age
- Customer Contact Gender
- Change in dealer
- Dealer Age
- Dealer gender MFP/Customer Usage Analytics Collected 412:
- Toner purchase/usage
- Toner purchase program on demand or automatic
- Counter/usage
- apps installed
- services purchased
- accessories purchased
- errors count
- length of downtime
- response time
- error codes Environmental Events 420:
- Change in economy
- Change in sector
- Company financial health
- Change in company location
- Change in employee count Multivariate analysis, and pattern recognition is used on collected data such that those factors that alone, or in combination, are correlated to predict churn in existing customers. This allows a company to determine whether a current/future customer is likely to discontinue services. When the prediction threshold is reached, service and sales employees can intervene to save a customer.

Data, such as that detailed above, can serve to change current processes and areas of focus. For example, if the frequency of error code for paper jams correlates highly with churn, it will allow a manufacturer to invest in technology to minimize the occurrence in paper jams over another error that is not correlated with attrition.

Figure 5:
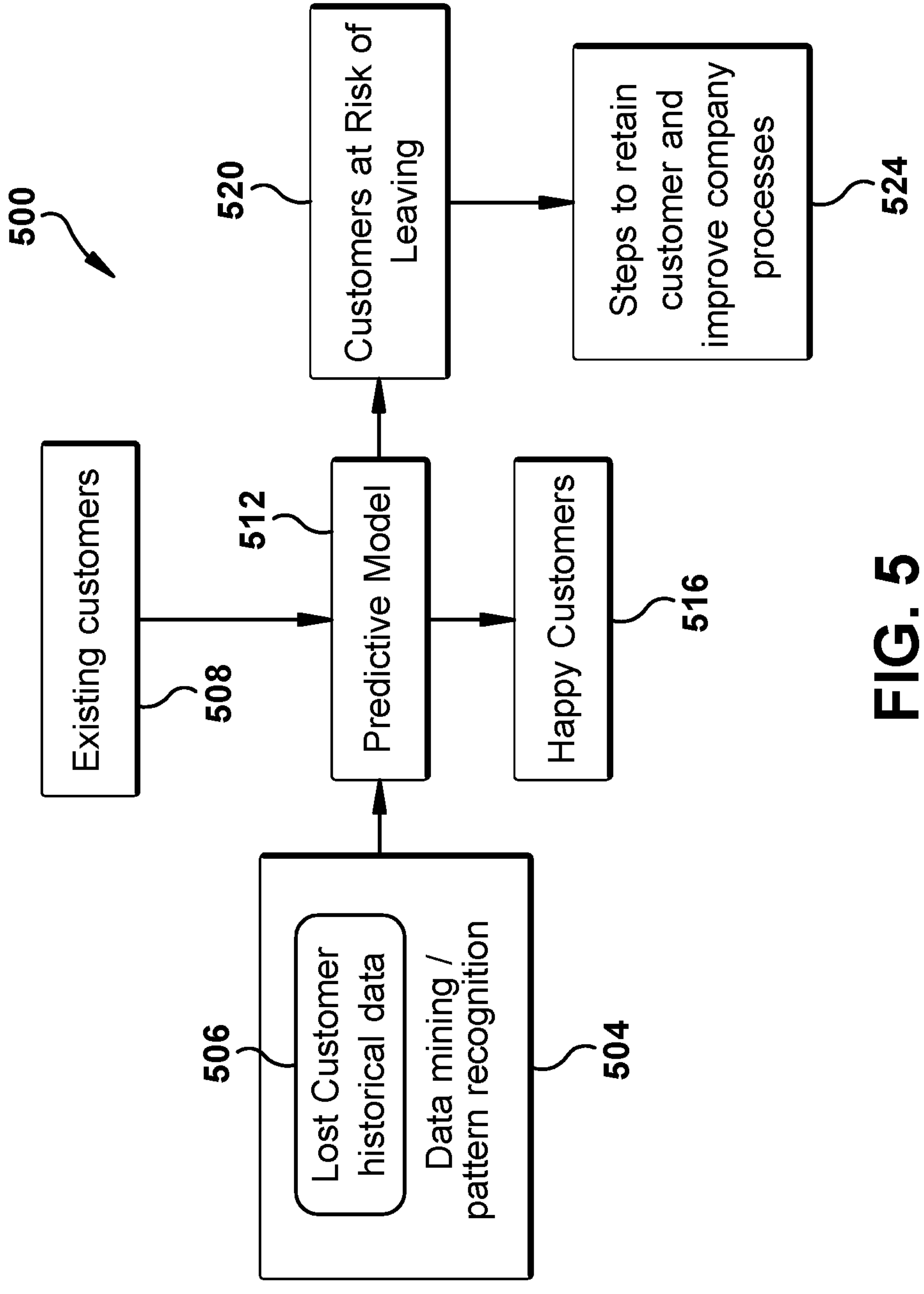
FIG. 5 illustrates block diagram for a system to predict and prevent customer churn in a servicing business.

FIG. 5 illustrates block diagram for a system 500 to predict and prevent customer churn in a servicing business. Data mining and pattern recognition is made from customer data, such as the event data listed above, along with historical event data for lost customers 506 illustrated at block 504. Data from block 504 is fed, along with data from existing customers at block 508, to predictive model 512. Predictive model 512 categorizes customers as happy customers at block 516 or customers at risk of leaving at block 520. Customers at risk of leaving are provided with remedial activity from block 524.

Figure 6:
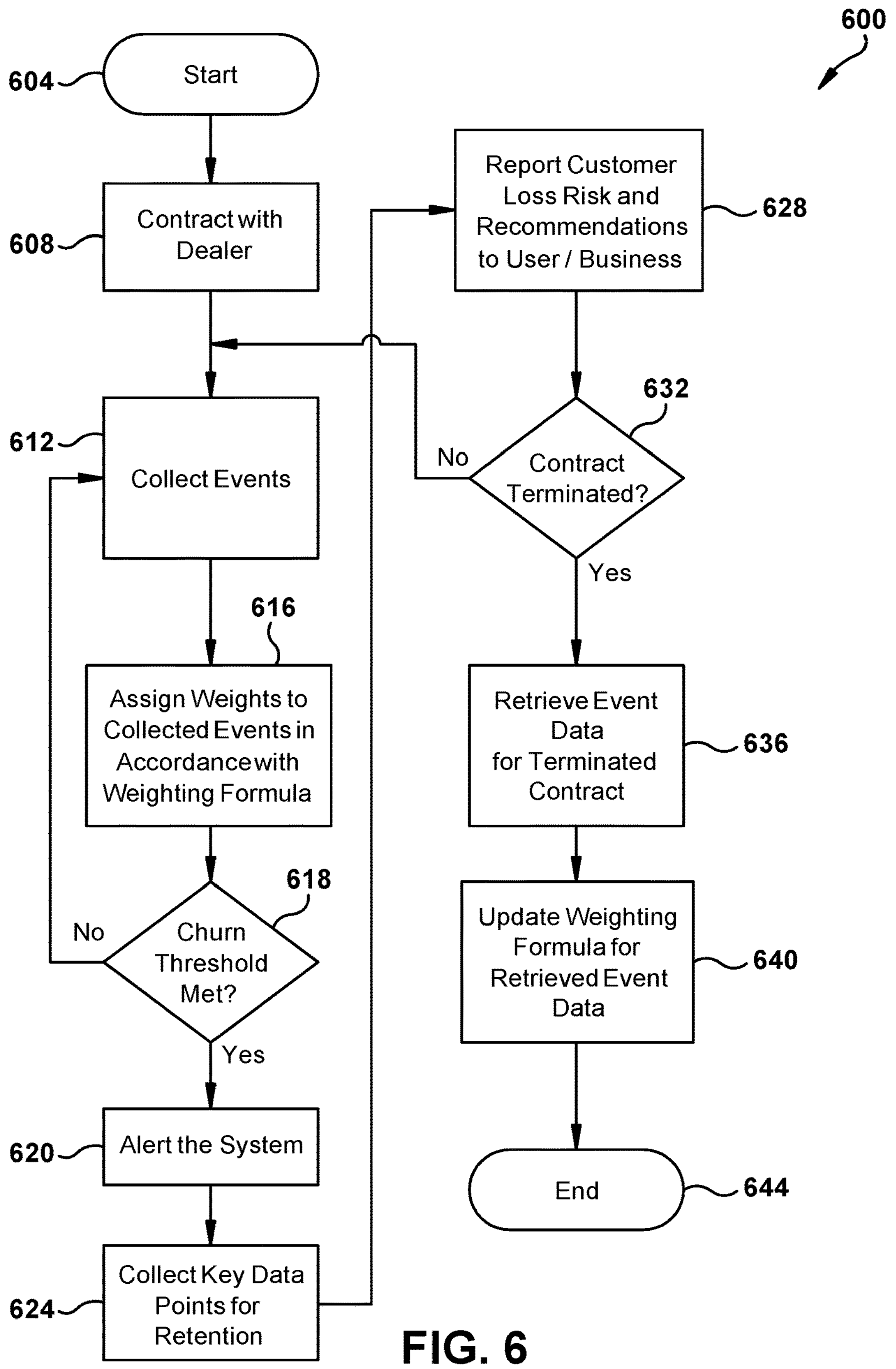
FIG. 6 illustrates a flowchart of an example embodiment of system to predict and prevent customer churn in a servicing business.

FIG. 6 illustrates flowchart 600 of an example embodiment of system to predict and prevent customer churn in a servicing business. The process commences at block 604 and proceeds to block 608 when a customer enters into a service contract with a dealer. Event data is collected at block 612 where it is subjected to AUML and weights are assigned to various events at block 616. A test of event weights is made for each customer contract at block 618 relative to a preselected threshold value. If the threshold is not exceeded, the process returns to block 612. If a threshold is met, an alert is generated at block 620 and key data points for retention are collected at block 624. A report is generated, along with recommendations corresponding to data for an at risk customer, at block 628. Example remedial measures may include customer meetings, contract price adjustment, price rebates, customer gifts, device replacement, software upgrades, or hardware upgrades.

If a contract was not terminated as determined at block 632, the process returns to block 612. If terminated, event data for the terminated contract is gathered at block 636 and provides for updated AUML at block 640. The process then ends at block 644.

Figure 7:
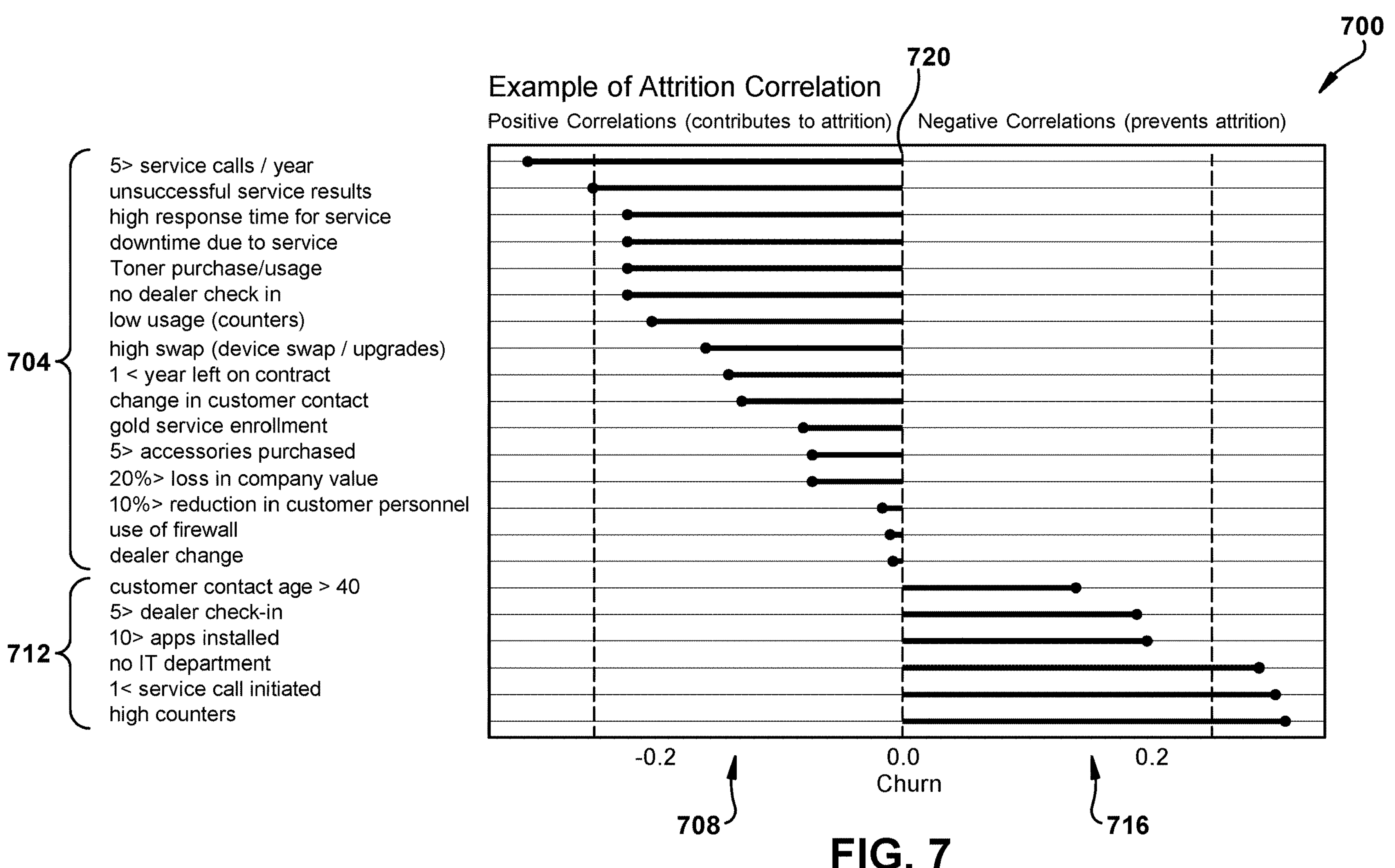
FIG. 7 is an example embodiment of a graphical rendering of attrition correlation.

FIG. 7 is an example embodiment of graphical rendering attrition correlation 700. Positive correlations 704, illustrated with weighted values are illustrated at 708. Positive correlations are those that may contribute to customer attrition. Negative correlations 712, illustrated with weighted values are illustrated at 716. Churn is determined when correlations exceed threshold 720.

In certain situations, such as when a distributor maintains fleets of MFPs for multiple customers, it can be problematic to manually address concurrent or frequent alerts. This can be time consuming and may result in setting an alert threshold higher to lessen alerts that are to be remediated. Further example embodiments automate some or all of remedial actions.

Figure 8:
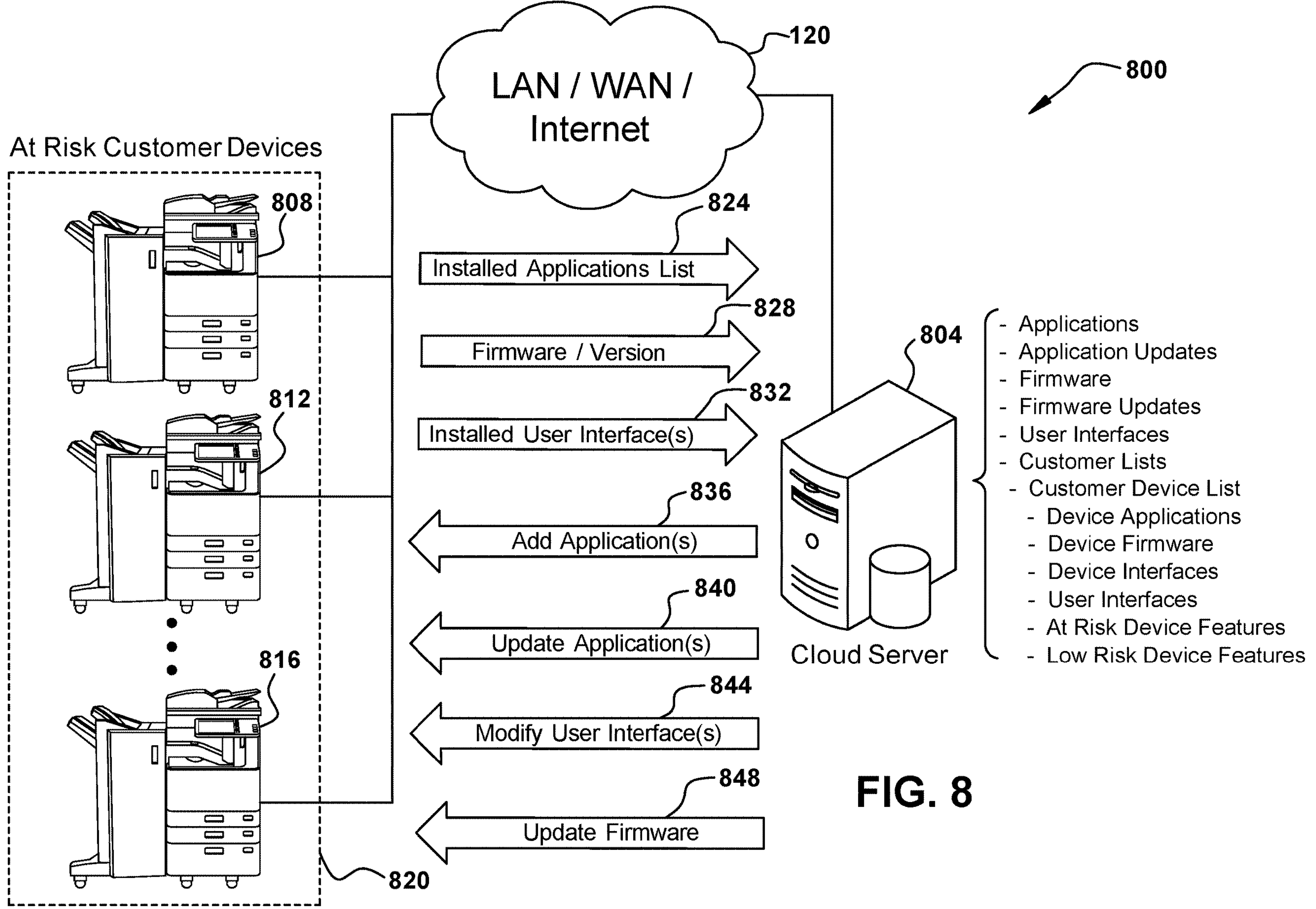
FIG. 8 illustrates an example embodiment of a system to automatically provide remedial actions to address predicted and preventable customer churn in a servicing business.

FIG. 8 illustrates an example embodiment of a system 800 to automatically provide remedial actions to address predicted and preventable customer churn in a servicing business. Cloud server 804 stores software, including applications and firmware, configurations and user interfaces for multifunction peripherals. Cloud server 804 suitably receives data identifying at risk devices from a server, such as server 108 of FIG. 1. Cloud server 804 is also provided with a risk threshold which may be lower than that associated with generating an alarm to an administrator. Certain improvements to enhance user experience may be accomplished by adding or updating applications, updating firmware or changing user interfaces. In the illustrated example, one or more MFPs, such as MFPs 808, 812 and 816 are identified as devices 820 associated with an at risk customer.

Cloud server 804 functions as a print management server running a suitable device management system. An example is provided with Toshiba TEC's e-Bridge Cloud Connect system (ECC). ECC is implemented as a web-based device management system that facilitates real-time monitoring of technical alerts and warnings, remote device configuration and software changes, and accumulation of service data for problem diagnosis and problem resolution.

Devices 820 communicate with cloud server 804 via network cloud 120 and report state information such as installed applications 824, firmware or firmware version 828, and user interface information 832. Cloud server 804 determines whether new or updated software, configurations or firmware may work to improve customer satisfaction. This is suitably accomplished by comparing device state information for devices 820 with device state information associated with comparable devices with different state information. Once cloud server determines what updates or modifications are of possible assistance, these are pushed to, and installed in devices 820. These include new applications 836, updated applications 840, modified user interfaces 844 and updated firmware 848.

Figure 9:
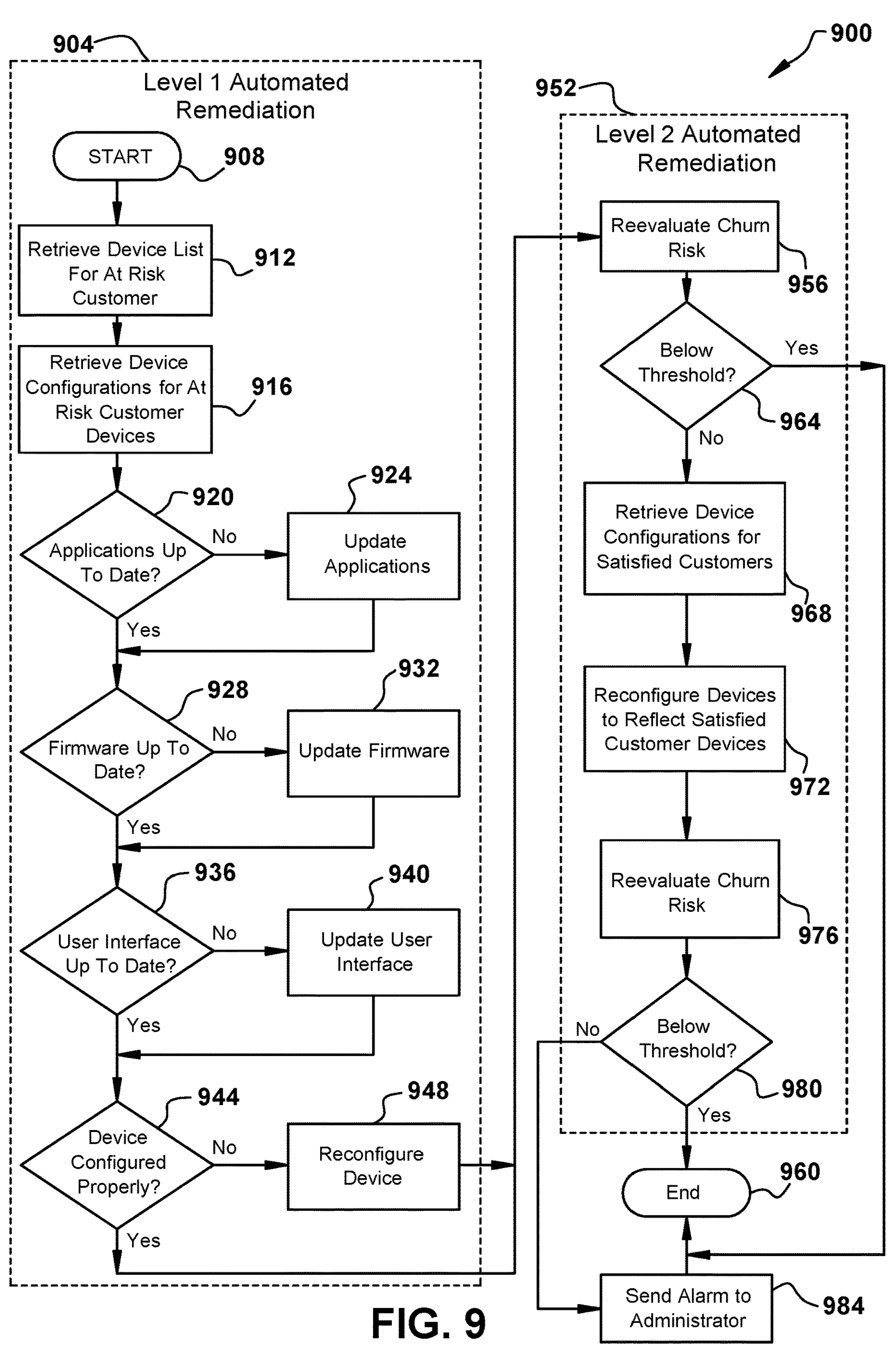
FIG. 9 illustrates a flowchart of an example embodiment of a system for automated remediation of devices associated with an at risk customer.

FIG. 9 illustrates an example embodiment of a system 900 for automated remediation of devices associated with an at risk customer, suitably in a system described above. Initially, a level 1 remediation 904 commences at block 908 and proceeds to block 912 wherein a device list is obtained for an at risk customer. Device state information is obtained from these devices at block 916. A check is made at block 920 to determine if applications are up to date. If not, they are updated at 924. Next, firmware is checked at block 928 and updated at block 932 if it is not. User interface information is then checked at block 936 and updated at block 940 if needed. Device configuration is checked at block 944 and reconfiguration is completed at block 948 if needed.

Next, the system determines whether level 2 automated remediation 952 is needed. Updated customer churn information is reevaluated at block 956. If it is determined at block 964 that this falls below an applied threshold, the system terminates at block 960. If not, updated device state information is obtained at block 968 device state information is obtained for comparable devices associated with satisfied customers at block 968. The devices for the at risk customer are then reconfigured in accordance with devices for satisfied customers at block 972. Updated customer churn information is reevaluated at block 976. If it falls below the threshold as determined at block 980, the system terminates at block 960. If it is above the threshold, an alarm is sent to an administrator at block 984 before ending at block 960.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:

a multifunction peripheral including a hardware monitor, wherein the hardware monitor includes one or more sensors that generate sensor data based on one or more of a toner level, an ink level, a temperature, and a paper jam of the multifunction peripheral; and a plurality of computers each including a processor and memory, the memory of one of the computers storing customer data, wherein the customer data includes usage analytics data of the multifunction peripheral based on generated sensor data received from the hardware monitor, and the customer data further includes at least one of (1) data regarding a service contract of the multifunction peripheral, (2) data regarding prior servicing of the multifunction peripheral, (3) personnel-related data regarding identifying characteristics of a customer or dealer of the multifunction peripheral, and (4) environmental data regarding economic or organizational conditions of the customer, and wherein the system is configured to perform the following steps to mitigate the risk of customer churn for multifunction peripherals:

executing an artificial intelligence (AI) model based on the customer data to assign a satisfaction weight to each of a plurality of ongoing events represented in the customer data, including assigning negative satisfaction weights to negative customer events and positive satisfaction weights to positive customer events;

determining that there is a customer churn risk by comparing a function of the assigned satisfaction weights to a preselected threshold level;

implementing one or more remedial actions in response to the determined customer churn risk by pushing, to the multifunction peripheral, one or more of (1) new software to be installed, (2) updates to existing software or firmware to be installed, and (3) configuration changes to be applied, wherein the multifunction peripheral then installs the new software or the updates to the existing software or firmware, or applies the configuration changes; and updating, in response to receiving an input corresponding to loss of the customer, the AI model to modify the assignment of satisfaction weights to ongoing events associated with other multifunction peripherals.

2. The system of claim 1, wherein the usage analytics data is comprised of error codes associated with operation of the multifunction peripheral.

3. The system of claim 1, wherein the usage analytics data is comprised of a copy count.

4. The system of claim 1, wherein the customer data includes the data regarding prior servicing of the multifunction peripheral, including information associated with service calls placed for the multifunction peripheral.

5. A method of mitigating the risk of customer churn for multifunction peripherals, the method comprising:

storing customer data including usage analytics data of a multifunction peripheral that is based on generated sensor data received from a hardware monitor of the multifunction peripheral, wherein the customer data further includes at least one of (1) data regarding a service contract of the multifunction peripheral, (2) data regarding prior servicing of the multifunction peripheral, (3) personnel-related data regarding identifying characteristics of a customer or dealer of the multifunction peripheral, and (4) environmental data regarding economic or organizational conditions of the customer;

executing an artificial intelligence (AI) model based on the customer data to assign a satisfaction weight to each of a plurality of ongoing events represented in the customer data, including assigning negative satisfaction weights to negative customer events and positive satisfaction weights to positive customer events;

determining that there is a customer churn risk by comparing a function of the assigned satisfaction weights to a preselected threshold level;

implementing one or more remedial actions in response to the determined customer churn risk by pushing, to the multifunction peripheral, one or more of (1) new software to be installed, (2) updates to existing software or firmware to be installed, and (3) configuration changes to be applied, wherein the multifunction peripheral then installs the new software or the updates to the existing software or firmware, or applies the configuration changes; and updating, in response to receiving an input corresponding to loss of the customer, the AI model to modify the assignment of satisfaction weights to ongoing events associated with other multifunction peripherals.

6. The method of claim 5, wherein the usage analytics data is comprised of error codes associated with operation of the multifunction peripheral.

7. The method of claim 5, wherein the usage analytics data is comprised of a copy count.

8. The method of claim 5, wherein the customer data includes the data regarding prior servicing of the multifunction peripheral, including information associated with service calls placed for the multifunction peripheral.

* * * * *